No. 709,460. Patented Sept. 23, 1902.
R. BARTELL.
POCKET.
(Application filed July 8, 1899.)
(No Model.)
5 Sheets—Sheet 1.
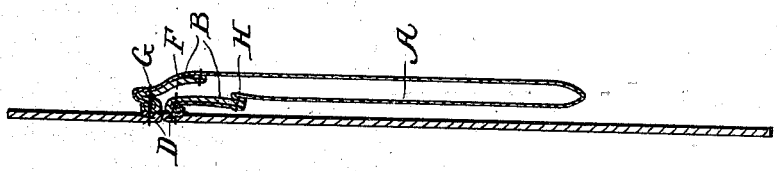
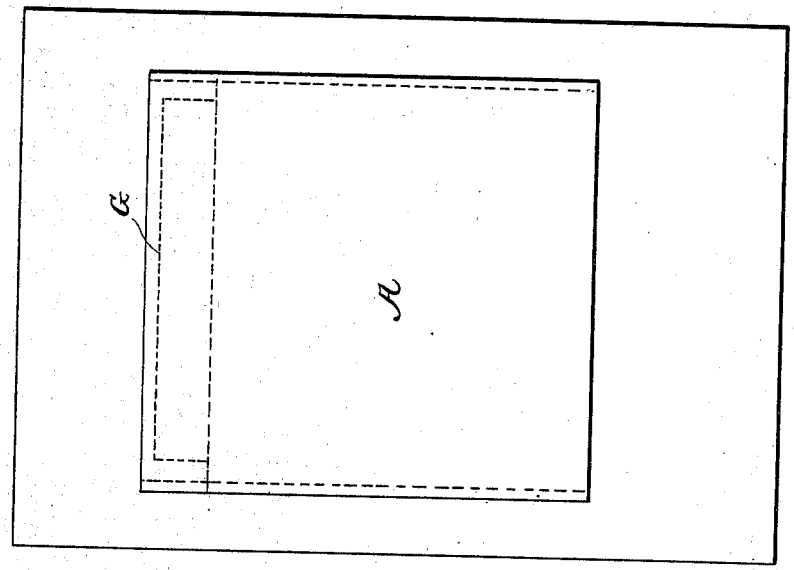
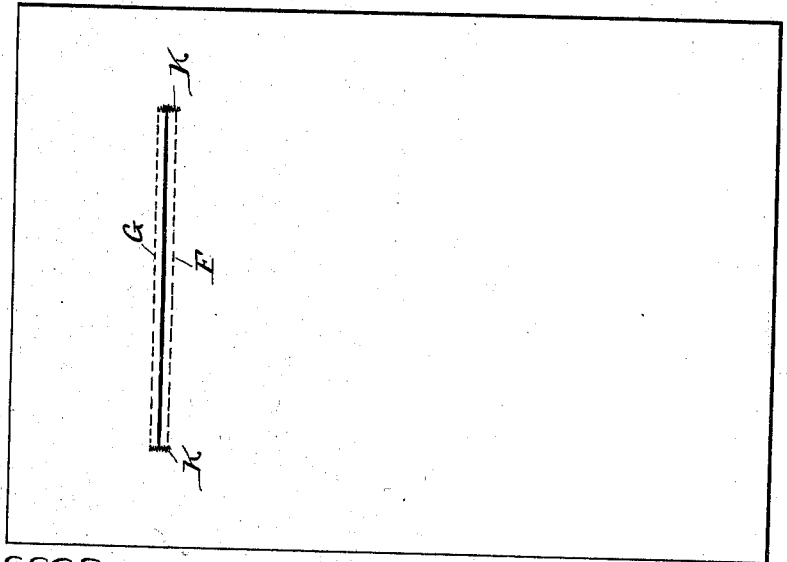
Witnesses
E. C. Wurdeman
S. J. Williamson
Inventor
Reinhold Bartell
by Geo. C. Hazelhorst
Atty No. 709,460. Patented Sept. 23, 1902.
R. BARTELL.
POCKET.
(Application filed July 8, 1899.)
(No Model.) 5 Sheets—Sheet 2.

Witnesses
E. C. Wurdeman
A. S. Williamson

Inventor
Reinhold Bartell
by Geo. C. Hazelton
Atty

No. 709,460. Patented Sept. 23, 1902.
R. BARTELL.
POCKET.
(Application filed July 8, 1899.)
(No Model.) 5 Sheets—Sheet 3.
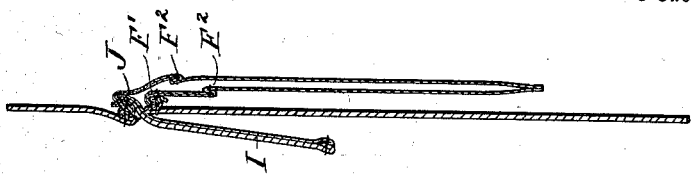
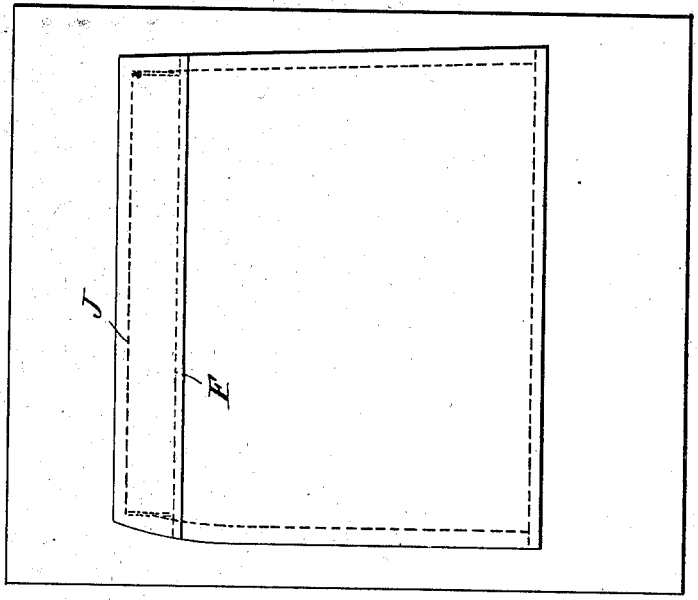
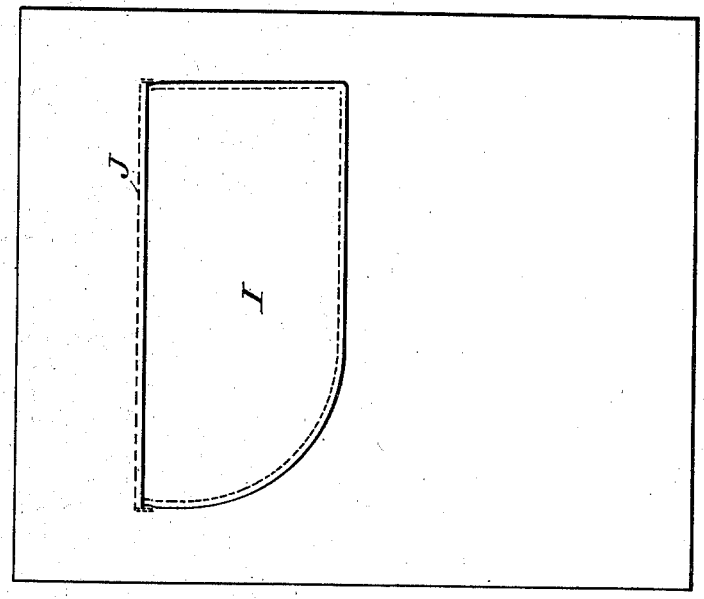
Witnesses
E. C. Wurdeman
J. J. Williamson
Inventor
Reinhold Bartell
by Geo. C. Hazelton
Atty No. 709,460. Patented Sept. 23, 1902.
R. BARTELL.
POCKET.
(Application filed July 8, 1899.)
(No Model.) 5 Sheets—Sheet 4.
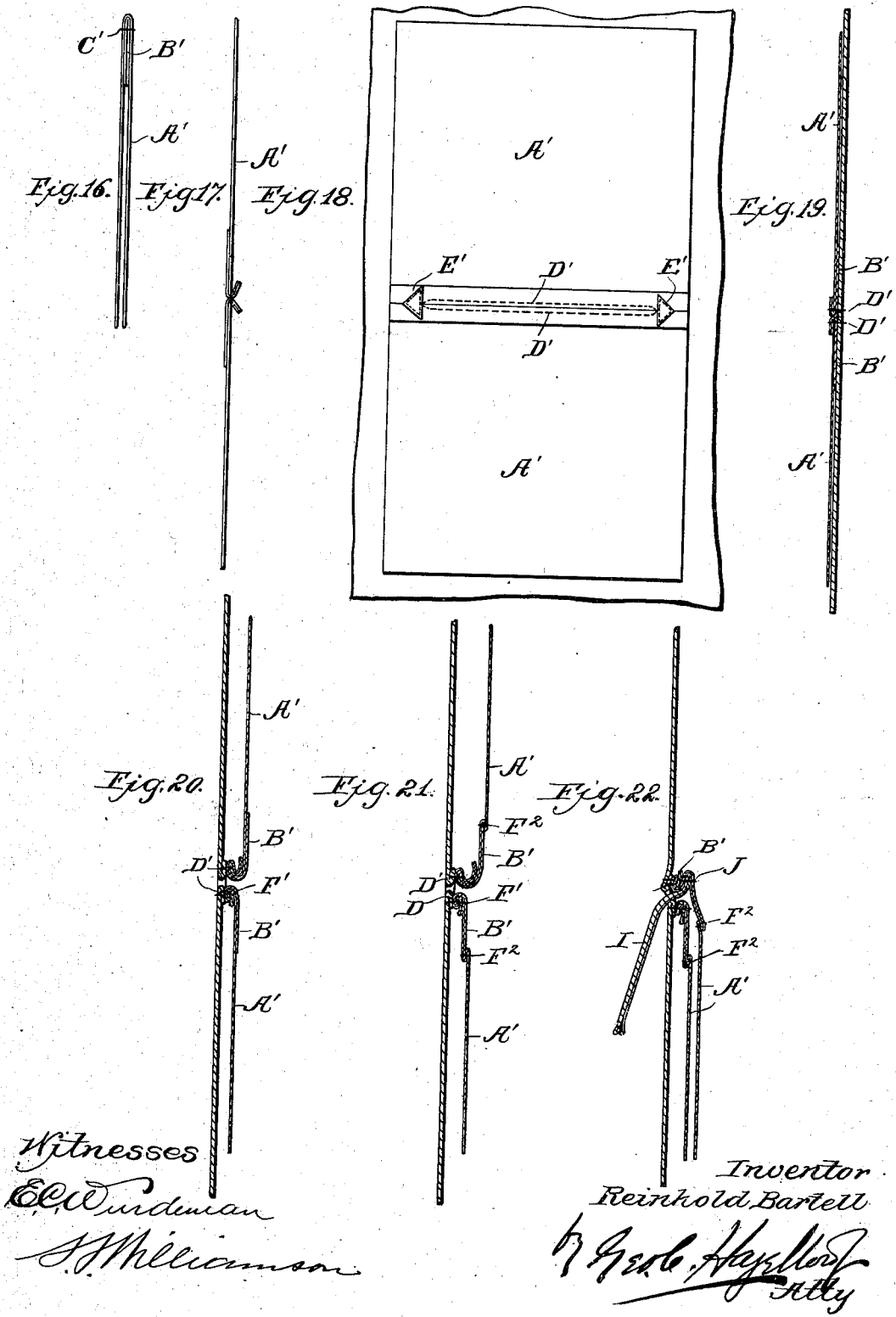
Witnesses
E. C. Wurdeman
S. J. Williamson
Inventor
Reinhold Bartell
by Geo. Hazzard
Atty No. 709,460. Patented Sept. 23, 1902.
R. BARTELL.
POCKET.
(Application filed July 8, 1899.)
(No Model.) 5 Sheets—Sheet 5.
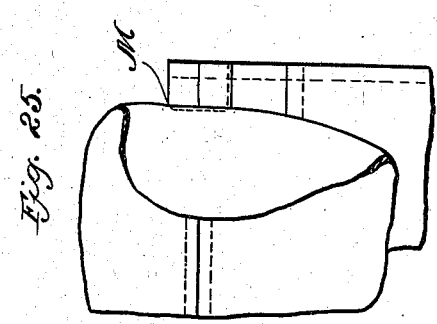
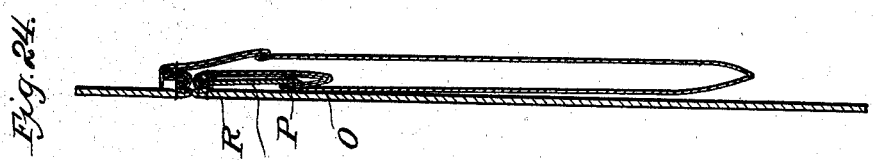
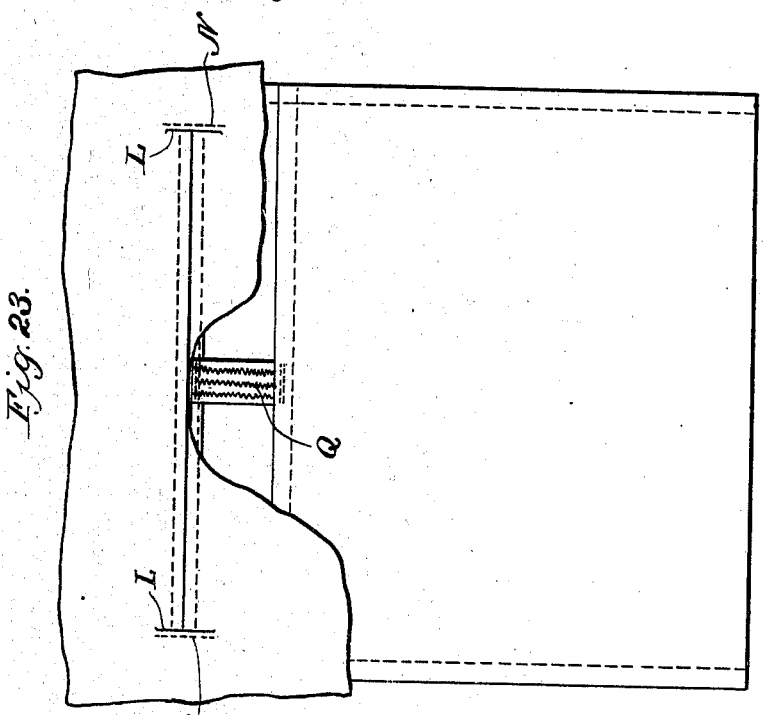

UNITED STATES PATENT OFFICE.

REINHOLD BARTELL, OF PHILADELPHIA, PENNSYLVANIA.

POCKET.

SPECIFICATION forming part of Letters Patent No. 709,460, dated September 23, 1902.

Application filed July 8, 1899. Serial No. 723,182. (No model.)

*To all whom it may concern:*

Be it known that I, REINHOLD BARTELL, a citizen of the United States, residing at Philadelphia, in the county of Philadelphia and State of Pennsylvania, have invented a certain new and useful Improvement in Pockets, of which the following is a specification.

My invention relates to new and useful improvements in pockets for garments and reinforce-strips therefor, and has for its object to produce an imitation welted pocket, form a pocket-opening at the top of the imitation welt, thereby avoiding the overlapping of the goods of the garment by the welt, providing a reinforce upon the inside of that portion of the garment which represents the welt, and making the pocket-strip in one piece; and a further object of my invention is to provide a double reinforce-piece the welted edges of which are secured together by a line of stitching, said strip being adapted to serve as a gage or pattern for cutting the pocket-opening in the garment and be utilized for securing the pocket-strip in place.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 4:
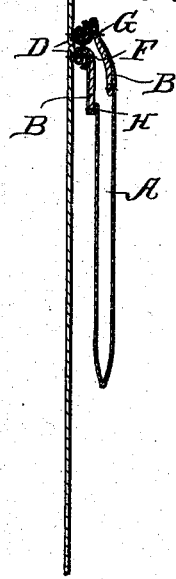
Figure 5:
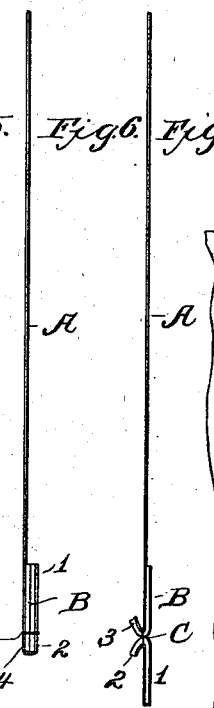
Figure 6:
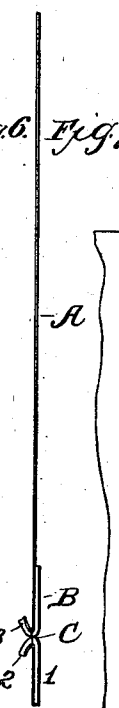
Figure 7:
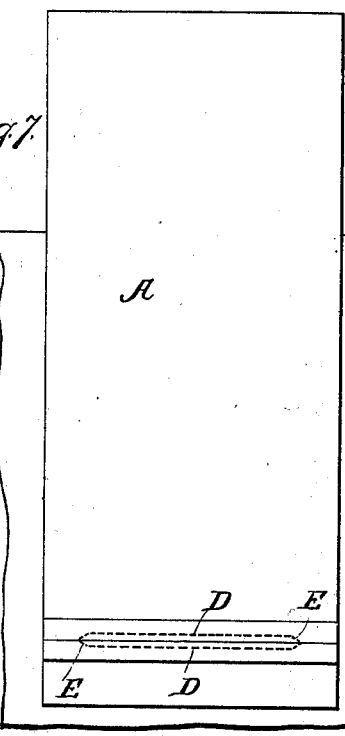
Figure 8:
Figures 9, 10:
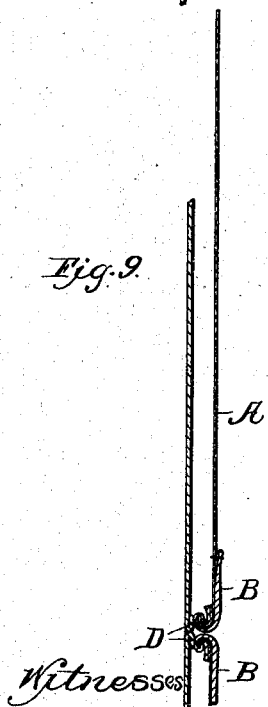
Figure 11:
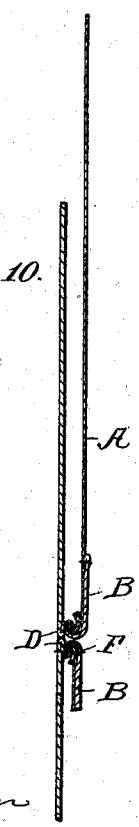
Figure 12:
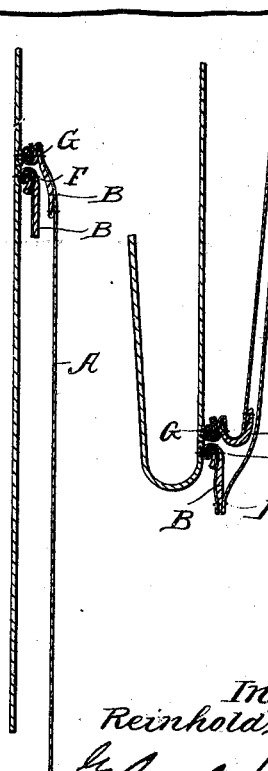

Figure 1 is a view showing the outer surface of a section of a garment, a trousers-pocket opening being shown therein as made in accordance with my improvement; Fig. 2, a rear view of such a section of the garment, showing the trousers-pocket in position; Fig. 3, a vertical section illustrating the method of constructing such a pocket; Fig. 4, a similar view showing the double turning of the facing for special kinds of pockets; Fig. 5, a section of the pocket-strip, showing the facing folded therein and stitched; Fig. 6, a similar view showing the facing and pocket strips cut along their folded edges and so turned as to make two folded edges along the line of stitching; Fig. 7, a view of a section of the garment, showing the pocket-strip and facing stitched thereto prior to the cutting of the pocket-opening; Fig. 8, a section in which the pocket-opening has been cut; Fig. 9, a section showing the pocket-strip turned inward through the pocket-opening; Fig. 10, a similar view showing the lower portion of the facing stitched down; Fig. 11, a similar view showing the pocket-strip and the upper portion of the facing turned down and stitched in place; Fig. 12, a section showing the lower end of the pocket-strip stitched to the lower portion of the facing, the section of the garment and pocket being turned so as to permit this stitching; Fig. 13, a view of the front face of a section of the garment, showing the appearance of a coat-pocket made in accordance with my improvement; Fig. 14, a reversed view showing the appearance of the pocket upon the inside of the garment; Fig. 15, a section showing the completed pocket and flap projecting through the pocket-opening; Fig. 16, a section of a coat-pocket strip and facing folded and stitched; Fig. 17, a similar view showing the sections of the strip and facing open, so as to permit two folded edges along the line of stitching; Fig. 18, a view of the outer surface of a section of the garment, showing the pocket-strip and facing stitched in place prior to the cutting of the pocket-opening; Fig. 19, a section thereof, showing the pocket-opening as having been cut; Fig. 20, a section showing the half of the pocket-strip and facing turned inward, the lower half being stitched down; Fig. 21, a similar view showing both halves of the pocket-strip plaited and stitched to the outer edge of the facing; Fig. 22, a similar view showing the flap stitched into place and drawn through the pocket-opening; Fig. 23, a rear view of a pocket, showing a plait formed therein and an elastic section so attaching the center of the plait to the garment as to support the plait and the formation of bar-takes at each end of the pocket-opening; Fig. 24, a section thereof; Fig. 25, a view showing a portion of the garment turned up so as to illustrate the formation of the bartake; and Fig. 26, a view similar to Fig. 24, showing the facing stitched flat to the pocket-strip, its edges being closed within the folded portions of the strip, but not themselves being folded.

In carrying out my invention as here embodied, reference being had to Figs. 1 to 12, inclusive, I first fold the pocket-strip A and the two facing-strips B together, as shown in Fig. 5, and stitch the same lengthwise, as indicated at C. The folded strip is then cut along the crease and the ends 1, 2, 3, and 4 turned, as shown in Fig. 6, so as to produce two folded edges of double thickness, being joined together by the stitching C. The pocket-strip and facing are then secured to the outer face of the garment by the lines of stitching D, which converge and meet each other at each of the ends, as indicated at E. After this has been accomplished the pocket-opening is cut by following the line of stitching C from the two points E, thus severing this stitching between these two points, as well as the goods through the same distance. The two portions of the pocket-strip and facing are then turned inward through the pocket-opening, and at the same time that portion of the goods of the garment lying between the stitches D and the edge of the pocket-opening upon both sides is also turned in, as clearly shown in Fig. 9. The lower portion of the pocket-strip and facing are next stitched down, as shown at F, after which the upper portion of the pocket-strip and facing are turned down and stitched, as indicated at G, and finally the free end of the upper portion of the pocket-strip and the free end of the lower pocket-strip are stitched together, as indicated at H. To facilitate this last operation, the goods of the garment are turned outward and upward, and the upper portion of the pocket-strip is likewise turned upward, as clearly shown in Fig. 12. The next step in the process of completing the pocket is to stitch the sides of the pocket-strip together, as is well understood.

For coats and like garments the arrangement shown in Figs. 13 to 22, inclusive, may be used and consists in folding the pocket-strip A' in half, the facing B' being previously placed thereon, so as to be folded therewith, and in this case this facing-strip is of one piece of sufficient width to make the two facings when properly folded. After folding the line of stitching C' serves to secure the sections in place, and the folded edges thereof are then cut to permit the pocket and facing strips to be opened out in two sections, as shown in Fig. 17, thus forming two folded edges, which meet and are secured together by the stitching C'. These strips are then secured to the outer face of the garment by the lines of stitching D', which, as stated in connection with the lines of stitching D, converge and meet at their ends. Gussets E' may be next stitched to the pocket and facing strips at the points where the stitchings D and D' converge to points, which will prevent any ripping of the pocket-opening when the latter is made.

I am aware that a variety of forms of gussets may be produced, and therefore do not limit myself in this respect.

As before described, the cutting of the stitching C' is used as a gage for the cutting of the pocket-opening in the goods of the garment, and this cutting takes place from one gusset to the other or from the points of convergence of the stitching D. When this has been accomplished, the sections of the pocket-strip and facing-strip are turned inward through the pocket-opening and likewise that portion of the goods of the garment which lies between the edges of the pocket-opening and the stitching D', as clearly shown in Fig. 20. The lower half of the pocket and facing strips is stitched down, as indicated at F', and the free ends of both the upper and lower halves of the facing-strip are secured by the folding over of the sections of the pocket-strip and the lines of stitching $F^2$. The next operation is the securement of the flap I between the upper portion of the facing and pocket strips, and this is accomplished by folding the latter, as shown in Fig. 22, and the line of stitching J. After this the lower ends of the two halves of the pocket-strip are secured together by stitching, and the sides thereof are also closed in the usual manner. After the flap is thus secured in place it may be drawn through the pocket-opening or left in the inside of the pocket, as best suits the fancy of the wearer, it being understood that the facing-strip will give the pocket a neat appearance at the opening.

The ends of the pocket-opening may be closed by bars of stitching K, as indicated in Fig. 1, or in any other suitable manner.

One of the principal features of my present invention consists in the formation of bars L at each end of the pocket-opening, as shown in Figs. 23 and 25, which serve to prevent the tearing or ripping of the pocket at these points and at the same time add no extra material of any kind, but are formed from the goods of the garment in the following manner: The goods are first folded at right angles to the pocket-opening, so as to cause the fold to lie immediately at the end of the opening, and this folded section is stitched, as indicated at M, after which the turned portion of the goods is again turned into its proper position and a second line of stitching N is formed, which stitches down the fold, and when the goods have been properly pressed these bars will only appear as a closed end, while offering the greatest amount of resistance to any tendency to tear or rip the pocket at these points, since there are thus obtained three thicknesses of the goods all stitched in a solid bar to sustain the strain upon the ends of the pocket-opening.

Another principal feature of my invention is the spring-retracted plaited pocket (shown in Figs. 23, 24, and 26) and consists in forming the plait O by folding the the pocket-strip upon itself and stitching the same, as indicated at P. Thus this portion when articles are placed within the pocket will be free to sag downward, thereby permitting the back portion of the pocket to receive the principal strain in the support of such articles, thus relieving the lower edge of the pocket-opening from the downward strain, which would tend to sag the same. In order to return the plaited portion of the pocket to its normal position when the strain is removed therefrom, I secure an elastic section Q to the plait by the stitching P and also to the lower edge of the pocket-opening by the stitching, which serves to hold the facing and pocket strip in place, as indicated at R. This elastic strip may be of any suitable material, or there may be one or more of such strips, as bests suits the requirements of the wearer, and in practice it will be found that such a construction will permit the pocket-opening to always remain normally closed, thus preventing the sagging and unsightly appearance which usually comes from wear and use of the pocket.

Of course I do not wish to limit the use of my pocket in connection with any particular garment, as it may be advantageously used wherever it is applicable and makes an exceedingly neat pocket-opening, as well as pocket, and at the same time costs less in manufacture than the old form of construction, while always maintaining the pattern of the goods in proper relation where it crosses the opening, and this is of great importance in patterns of pronounced stripes, it being understood that after the pocket-opening has been cut and the edges of the deflected lines of stitching turned in the goods are drawn lengthwise of said opening, so as to again close the pocket-opening by bringing the turned edges thereof into contact.

I desire to call attention to the fact that the pocket-strip can be so attached as to be first turned downward and finally closed by stitching to the upper portion of the facing.

Having thus fully described my invention, what I claim as new and useful is—

1. In a garment having a pocket-opening, bars comprising a plurality of folds extending across the ends of the openings, said folds being stitched, a pocket-strip, a facing-strip secured thereto, a plait formed in the pocket-strip and means for yieldingly supporting the pocket-strip.

2. In a garment having a pocket-opening, bars at each end of the pocket-opening comprising folds of the material from which the pocket-opening is cut, said folds being stitched substantially as described.

In testimony whereof I have hereunto affixed my signature in the presence of two subscribing witnesses.

REINHOLD BARTELL.

Witnesses:
MARY E. HAMER,
L. W. MORRISON.